(12) United States Patent
    Oh

(10) Patent No.: US 10,221,828 B2
(45) Date of Patent: Mar. 5, 2019

(54) HYDROELECTRIC POWER GENERATION DEVICE FOR PIPELINE

(71) Applicant: Taekgeun Oh, Daejeon (KR)

(72) Inventor: Taekgeun Oh, Daejeon (KR)

( * ) Notice: Subject to any disclaimer, the term of this patent is extended or adjusted under 35 U.S.C. 154(b) by 79 days.

(21) Appl. No.: 15/549,153

(22) PCT Filed: Jan. 29, 2016

(86) PCT No.: PCT/KR2016/000972
    § 371 (c)(1),
    (2) Date: Aug. 5, 2017

(87) PCT Pub. No.: WO2016/133294
    PCT Pub. Date: Aug. 25, 2016

(65) Prior Publication Data
    US 2018/0023533 A1    Jan. 25, 2018

(30) Foreign Application Priority Data
    Feb. 16, 2015  (KR) .................. 10-2015-0023366

(51) Int. Cl.
    *F03B 3/12*    (2006.01)
    *F03B 7/00*    (2006.01)
    *F03B 17/06*   (2006.01)
(52) U.S. Cl.
    CPC ............... *F03B 3/121* (2013.01); *F03B 7/00* (2013.01); *F03B 17/06* (2013.01); *F03B 17/062* (2013.01); *Y02E 10/223* (2013.01); *Y02E 10/28* (2013.01)
(58) Field of Classification Search
    CPC .... F03B 3/12; F03B 7/00; F03B 17/06; F03B 17/062; F03B 3/121; Y02E 10/28; Y02E 10/223

USPC ....................................................... 290/44, 55
See application file for complete search history.

(56) References Cited

U.S. PATENT DOCUMENTS

| | | | | |
|---|---|---|---|---|
| 4,782,258 A | * | 11/1988 | Petrosky | B25J 9/126 310/112 |
| 6,239,501 B1 | * | 5/2001 | Komarechka | A43B 3/00 290/1 R |
| 7,102,249 B2 | * | 9/2006 | Wobben | F03B 13/10 290/400 |

FOREIGN PATENT DOCUMENTS

| | | |
|---|---|---|
| CN | 103161645 | 6/2013 |
| CN | 105089916 | 11/2015 |
| DE | 3911125 | 10/1990 |
| GB | 2190144 | 11/1987 |
| JP | 2003307173 | 10/2003 |
| JP | 2012528970 | 11/2012 |
| KR | 10-2002-0017031 | 3/2002 |
| KR | 20-0329785 | 10/2003 |
| KR | 10-2006-0035710 | 4/2006 |
| KR | 20-0415733 | 5/2006 |
| KR | 20-0415748 | 5/2006 |
| KR | 10-0780316 | 11/2007 |

(Continued)

*Primary Examiner* — Naishadh N Desai
(74) *Attorney, Agent, or Firm* — Lee & Associates, LLC

(57) ABSTRACT

Provided is a hydroelectric power generator for a pipeline that is installed at a position in a pipeline to generate electricity using a rotating turbine by inducing a flow velocity of water therein and uses environment-friendly energy through the water velocity while varying in size in accordance with the size of a pipeline to generate electricity even at a low-speed stream. The hydroelectric power generator for a pipeline generates electricity with high efficiency by increasing an angular speed at the same flow speed by adjusting the number and radius of turbine blades.

8 Claims, 14 Drawing Sheets

(56) References Cited

FOREIGN PATENT DOCUMENTS

| | | | |
|---|---|---|---|
| KR | 10-2010-0104694 | 9/2010 | |
| KR | 10-1127565 | 3/2012 | |
| KR | 10-1418011 | 7/2014 | |
| KR | 101418011 B1 * | 7/2014 | ............ F03B 17/065 |
| WO | 2005116444 | 12/2005 | |

* cited by examiner

HYDROELECTRIC POWER GENERATION DEVICE FOR PIPELINE

CROSS-REFERENCE TO RELATED APPLICATIONS

This application is a national stage application of International Patent Application No. PCT/KR2016/000972 filed on Jan. 29, 2016, which claims priority to Korean Patent Application No. 10-2015-0023366 filed on Feb. 16, 2015, the entire contents of which are incorporated by reference herein.

TECHNICAL FIELD

The present invention relates to a hydroelectric power generator for a pipeline, and more particularly, to a hydroelectric power generator for a pipeline that is installed at a position in a pipeline, generates electricity using a rotating turbine by inducing a flow velocity of water therein, uses environment-friendly energy through the water velocity, varies in size in accordance with the size of a pipeline to generate electricity even at a low-speed stream, and generates electricity with high efficiency by increasing an angular speed at the same flow speed by adjusting the number and radius of turbine blades.

BACKGROUND

As the types of power generation, generally, there are thermal power generation, nuclear power generation, hydroelectric power generation, solar power generation, wind power generation, tidal power generation, etc. That is, thermal power generation and nuclear power generation generate electricity by rotating a turbine in a power generator using vapor produced by heat, and hydroelectric power generation generates electricity by rotating a turbine using a head drop of water stored by a dam.

However, thermal power generation uses fossil fuel such as coal or oil as an energy source. The construction expense of a power plant is relative low, but the reserves of fossil fuel are limited, so there is a problem of exhaustion of the energy source and environmental contamination.

Nuclear power generation, which uses a large amount of heat that is produced by nuclear fission of a radioactive material such as uranium, can generate a large amount of electricity, but causes severe environmental contamination due to radioactivity.

Accordingly, there has been much research on hydroelectric power generation that can generate electricity without environmental contamination, and on actual systems for the hydroelectric power generation.

However, hydroelectric power generation systems use a topology having a high head drop, so geometrical environments were used or huge structures were required to obtain a high head drop from a dam.

Due to the structural barrier of providing a large head drop, the ecological connection is necessarily broken between the upstream side and the downstream side of a power plant. Further, existing hydroelectric power plants are usually constructed among the mountains with slopes that are far from cities where most users dwell, so large costs are required to construct facilities for transmission electricity.

Accordingly, a technology that can be used for a low head drop and a low flow speed has been disclosed in Korean Patent Application Publication No. 10-2010-0104694 (published on Sep. 20, 2010), in which a rotary unit that is rotated at a low head drop and a low flow speed of water is disposed between support members installed on the ground to generate electricity, so power generation may be performed with high efficiency, but the installation place is limited to the ground, so usability is low.

Meanwhile, various floating hydroelectric power generators that are available for a low head drop and a low flow speed have been proposed, but the actual use is limited due to the following problems.

Korean Utility Model No. 20-0329785 (registered on Oct. 1, 2003) has proposed a configuration that mounts a plurality of water turbines on a floating structure and generates electricity with the water turbines submerged in water by a half or less, but the efficiency of the water turbines is necessarily lower than a floating facility, so it is inefficient.

Korean Utility Model No. 20-0415733 (registered on May 1, 2006) has proposed a configuration that installs floats at both sides on water and installs a water turbine between the floats to generate electricity, so the costs for the facility is relatively low and high-efficiency power generation is expected, but the configuration for fixing the floats and structurally combining the floats with the water turbine is not proposed in detail in terms of structural stability and practical use, so there are many unstable factors.

Korean Utility Model No. 20-0415748 (registered on May 1, 2006) has proposed a configuration that installs a water turbine on a structure floating on water such as a barge and generates electricity using the torque produced by the portion of the water turbine under the water, so the floating barge looks stable, but it is difficult to fix the barge and this configuration is inappropriate to a place keeping a small amount of water.

As described above, hydroelectric power generation systems using water turbines mounted on a floating structure may be considered as being somewhat insufficient in terms of actual use and efficiency including the costs for constructing the floating facility, and a loss of power due to the floats.

Recently, many hydroelectric and tidal power generation facilities have been developed to solve this problem. It may be considered that many hydroelectric power generation facilities using a head drop provided by an artificial reservoir to save costs of energy for generating electricity have been constructed for this reason.

In particular, since rivers on a gentle slope flow slow, it is so difficult at present to generate electricity using the rivers, and those power generation facilities have low efficiency. Accordingly, there are few power generation facilities of this type.

Accordingly, it is required to research and develop a hydroelectric power generation system that can appropriately deal with various environmental changes using a slowly flowing river and the width of the river at an area with a relatively small head drop.

Further, various pipelines such as a water supply pipe, a drain pipe, and a rainwater pipe are used to delivery water or fluid to various positions and places and various streams are generated through the pipelines, but it is difficult to efficiently generate electricity using the streams and it is also difficult to efficiently generate electricity from a low-speed streams and various positions.

PRIOR ART DOCUMENT (Patent Document 1) Document 1. Korean Patent Application Publication No. 10-2010-0104694 (2010 Sep. 20)
(Patent Document 2) Document 2. Korean Utility Model No. 20-0329785 (2003 Oct. 1)

(Patent Document 3) Document 3. Korean Utility Model No. 20-0415733 (2006 May 1)
(Patent Document 4) Document 4. Korean Utility Model No. 20-0415748 (2006 May 1)

SUMMARY

Accordingly, an object of the present invention is to provide a hydroelectric power generator that is installed in a pipeline having a relatively small head drop and generates electricity from eco-friendly energy by rotating a turbine without influence on a stream in the pipeline.

Another object of the present invention is to achieve high-efficiency power generation by maximizing rotational energy by increasing an angular speed when a stream of water is applied to a turbine and blades.

Another object of the present invention is to achieve high-efficiency power generation by making flow and rotation of a turbine and blades in the same direction.

Another object of the present invention is to achieve high-efficiency power generation by increasing an angular speed at the same flow speed by adjusting the number and radius of blades of a turbine.

Another object of the present invention is to achieve high-efficiency power generation by generating torque corresponding to the number of blades from a rotary shaft by generating the same pressure on the blades by generating a water head with a predetermined gap between ends of blades and a power generation guide.

A hydroelectric power generator for a pipeline of the present invention includes: a rectangular inlet pipe having an inlet port connected to an inlet pipe, and connected to an inlet through the inlet port; a pair of guide units forming an upper drainage in which blades are deployed at an upper portion behind the inlet connected to the rectangular inlet pipe, a blade guide formed under the upper drainage so that the blades are reclined therein, and an outlet for discharging water flowing through the drainage; and a turbine fitted on a turbine shaft disposed through the guide units, having reinforcing grooves fitted on two sides to reinforcing portions of the blades in blade seats formed with regular intervals on an outer side thereof, and having fixed shafts disposed through the blade seats, the turbine having a narrow gap from a blade guide to recline the blades and a wide gap from a power generation guide to deploy the blades, and being combined with turbine covers on both sides by turbine screws to be rotatable inside the guide units such that the turbine shaft rotates on bearings through the guide units; the blades disposed in the blade seats, coupled to the turbine covers through the fixed shaft, and rotating the turbine when deployed by water; and a rectangular outlet pipe connected to the outlet and having an outlet port connected to an outlet pipe, wherein a packing is disposed between the turbine covers coupled to both sides of the turbine and the blades are disposed in the blade seats formed with regular intervals, and the blades are fitted on the fixed shafts, are rotatably held at both sides by movable bushings, have an outer end protruding from the blade seats, and have the reinforcing portion fitted to two sides of the reinforcing grooves.

According to the present invention, it is possible to generate electricity from eco-friendly energy by rotating the turbine without changing the stream in a pipe having a relatively low head drop of water.

Further, the hydroelectric power generator can be varied in size to generate electricity in accordance with the size of a pipe and a stream without being influenced by the size of the pipe and the stream and can be disposed a plurality of positions with regular intervals in a pipe, to efficient power generation is possible.

Further, the hydroelectric power generator can be connected to a pipe for supplying water for power generation and strength for resisting load applied to the blades, which are reclined or deployed by water on the turbine, is increased, so it is possible to efficiently generate power.

Further, since the flow direction of a stream in a pipe and the movement directions of the turbine and the blades are the same, it is possible to generate power with high efficiency.

Further, it is possible to generate power with high efficiency by increasing the angular speed at the same flow speed by controlling the numbers and radius of the blades of the turbine.

Further, since velocity heads are made by the gap between the ends of the blades and the power generation guide, so the same pressure is applied to the blades and torque corresponding to the number of the blades is applied to the rotary shaft of the turbine, whereby high-efficiency power generation is achieved.

DETAILED DESCRIPTION OF PREFERRED EMBODIMENTS

Exemplary embodiments of the present invention are described hereafter in detail with reference to the accompanying drawings.

Figure 1:
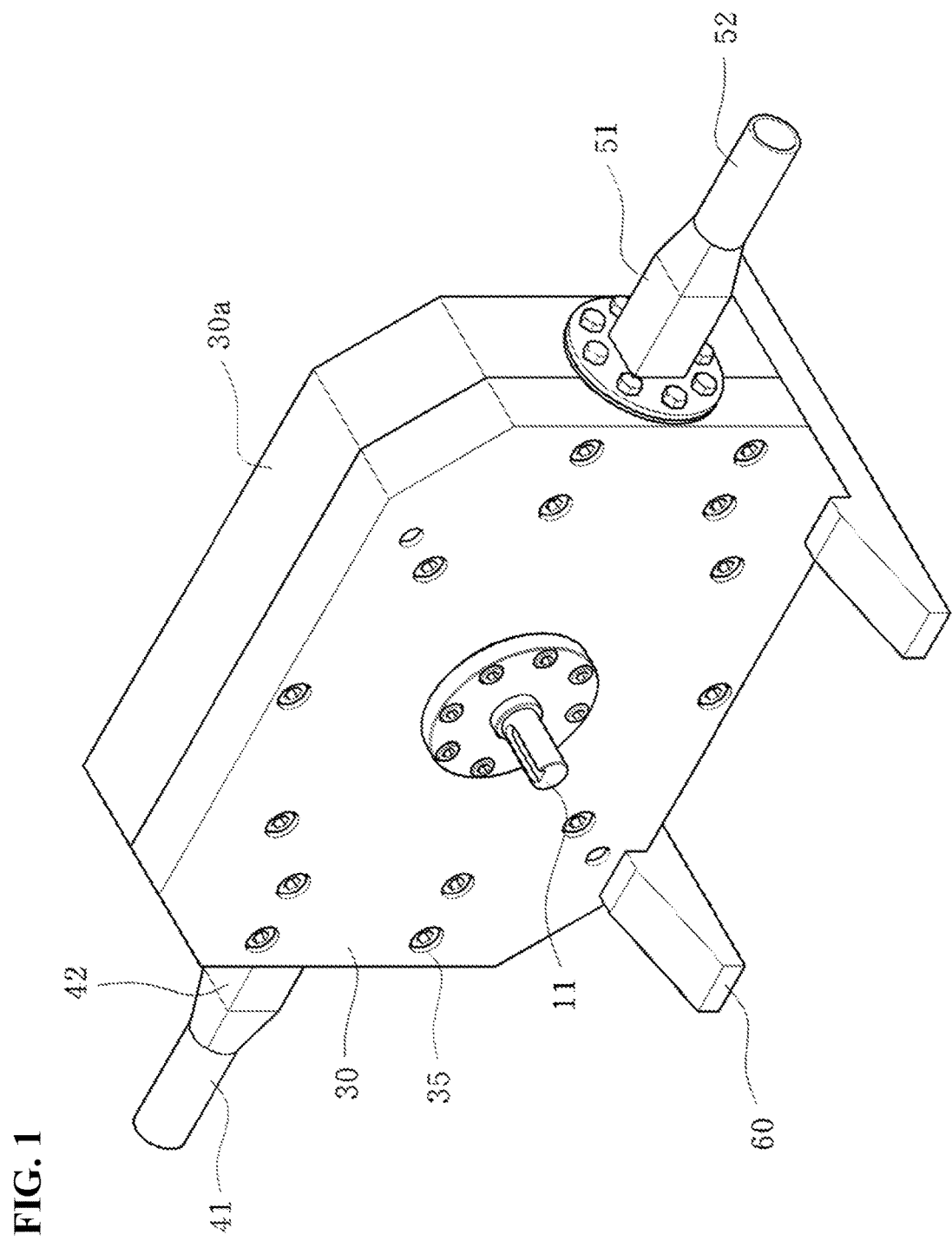
FIG. 1 is a perspective view showing installation of an embodiment of the present invention.
Figure 2:
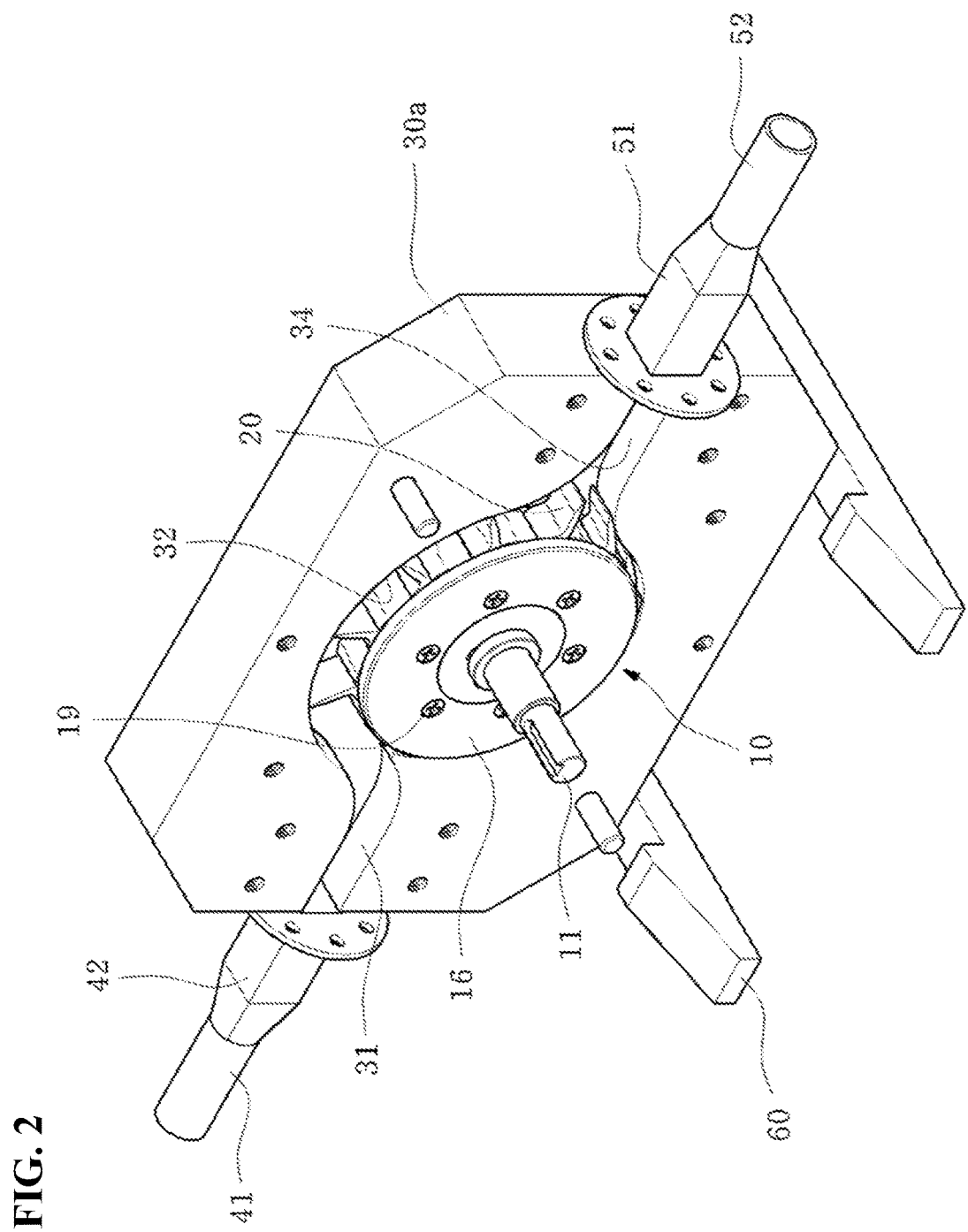
FIG. 2 is a perspective view showing the inside of the present invention.
Figure 3:
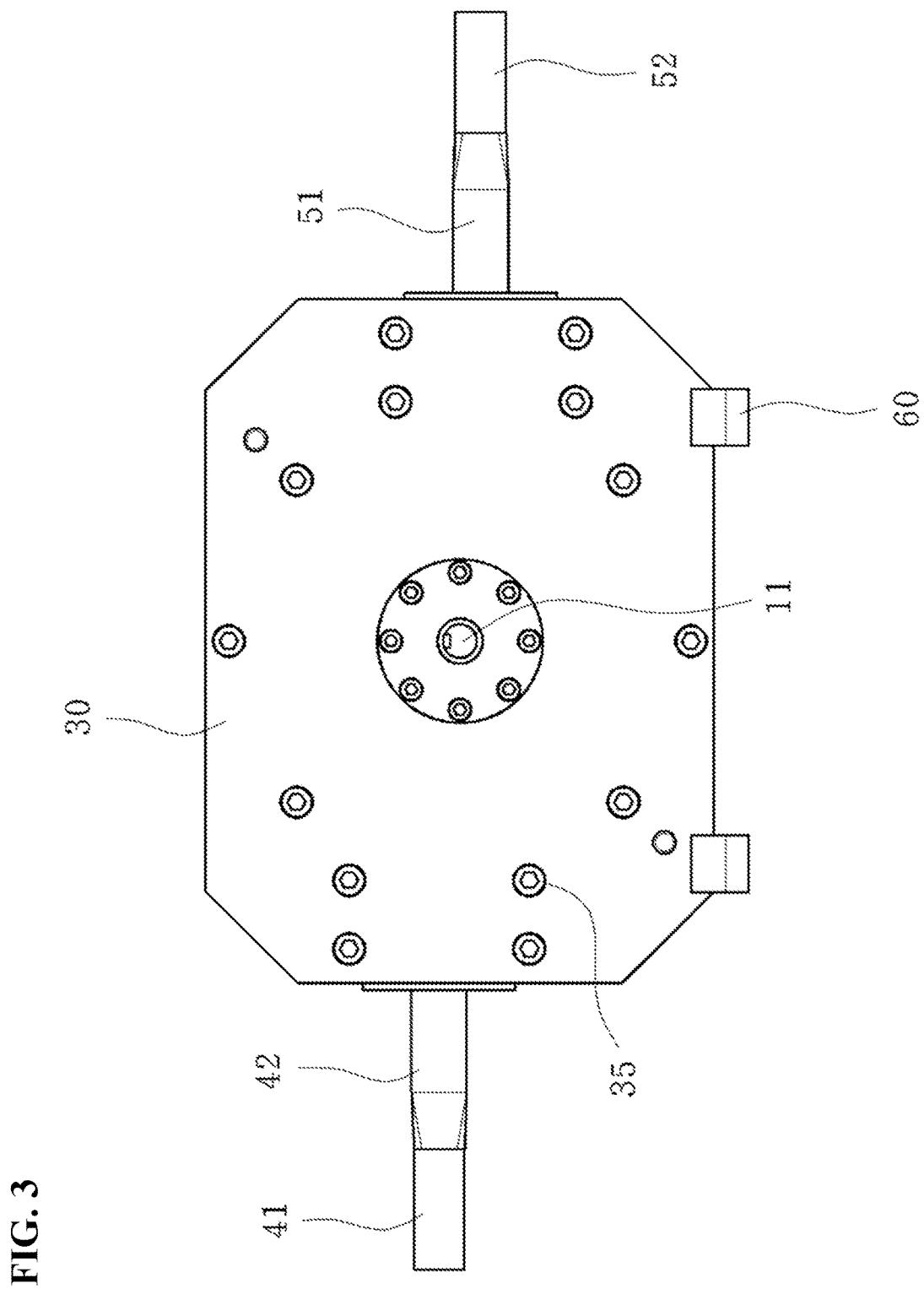
FIG. 3 is a front view showing the present invention.
Figure 4:
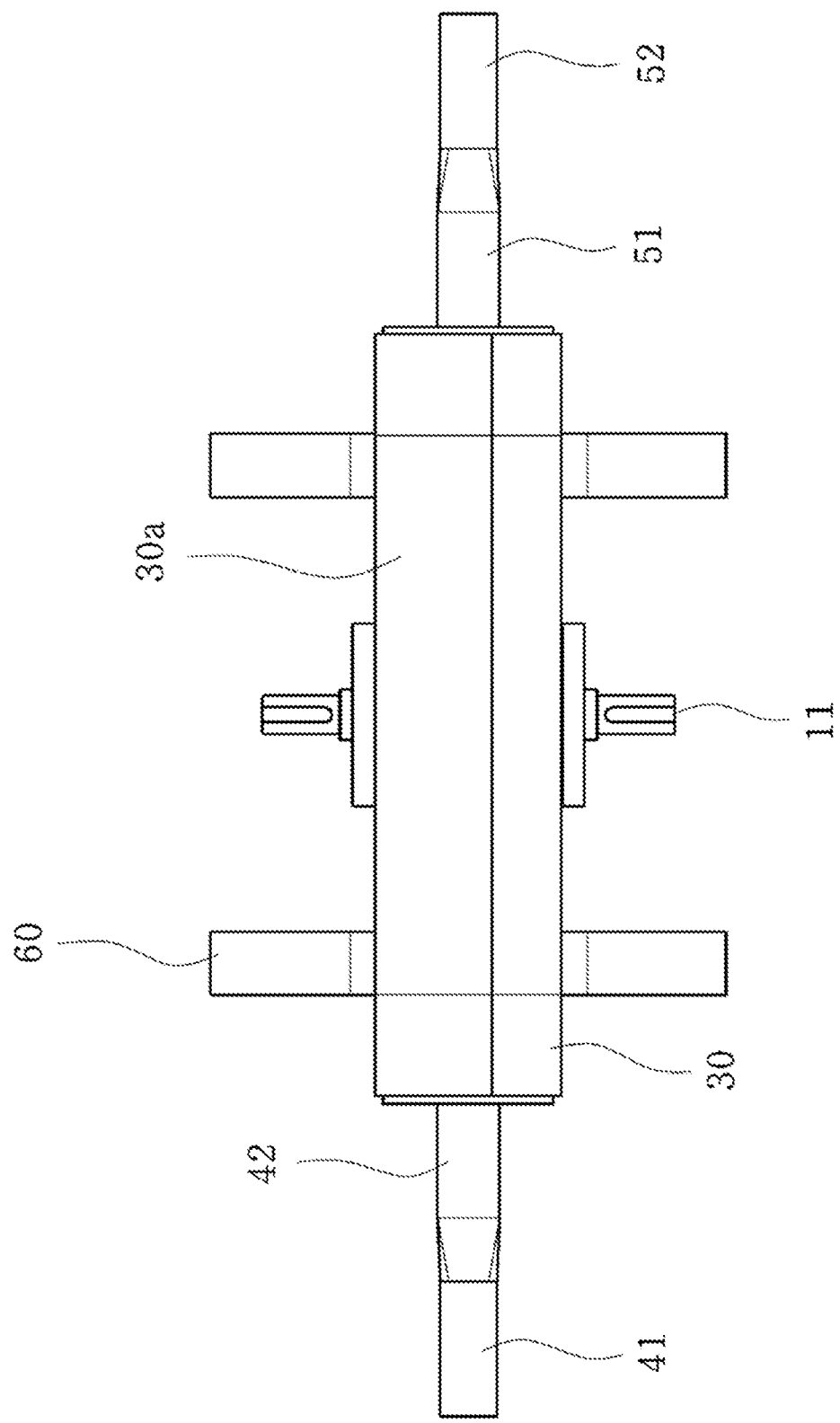
FIG. 4 is a plan view showing the present invention.
Figure 5:
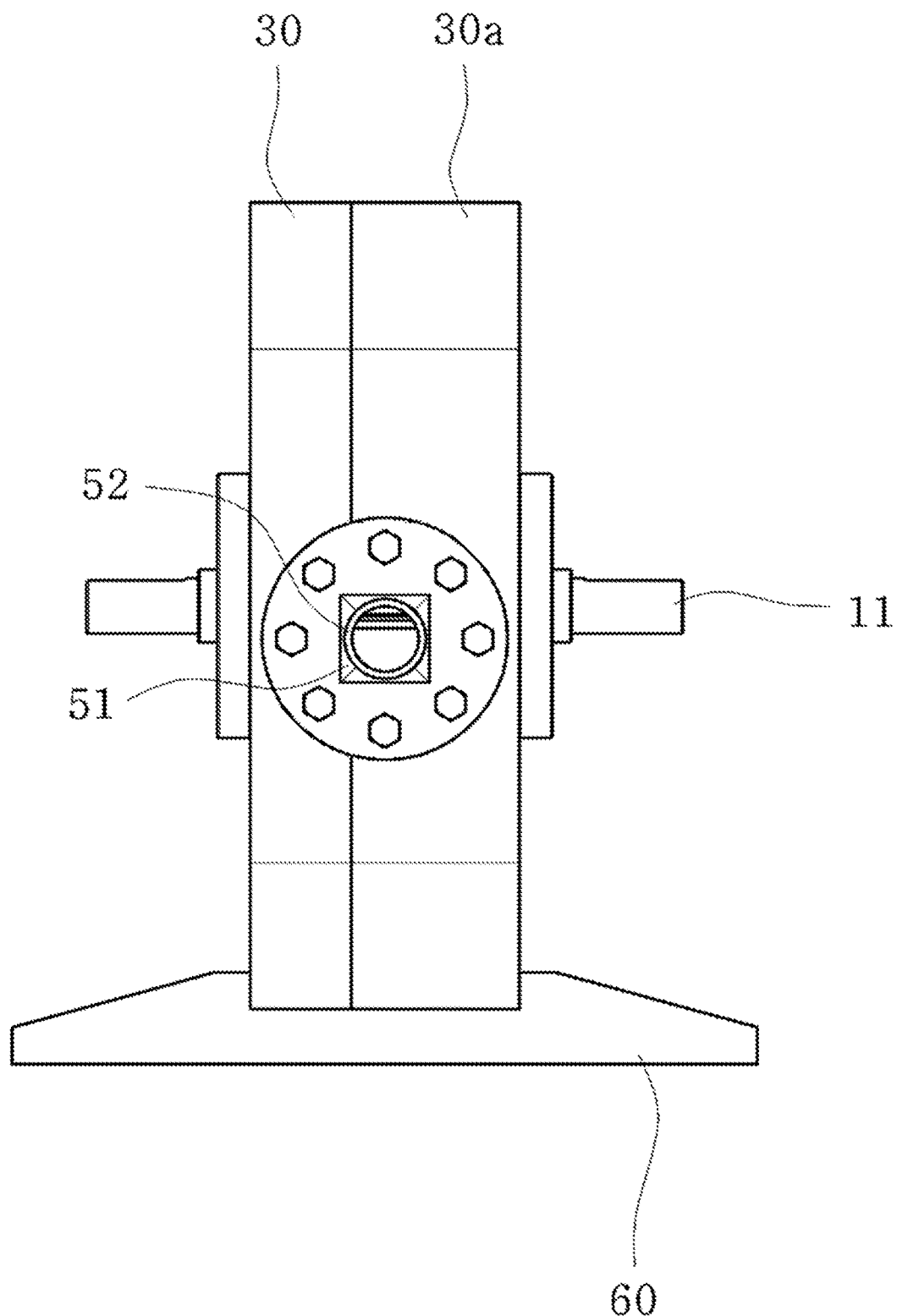
FIG. 5 is a side view showing the present invention.
Figure 6:
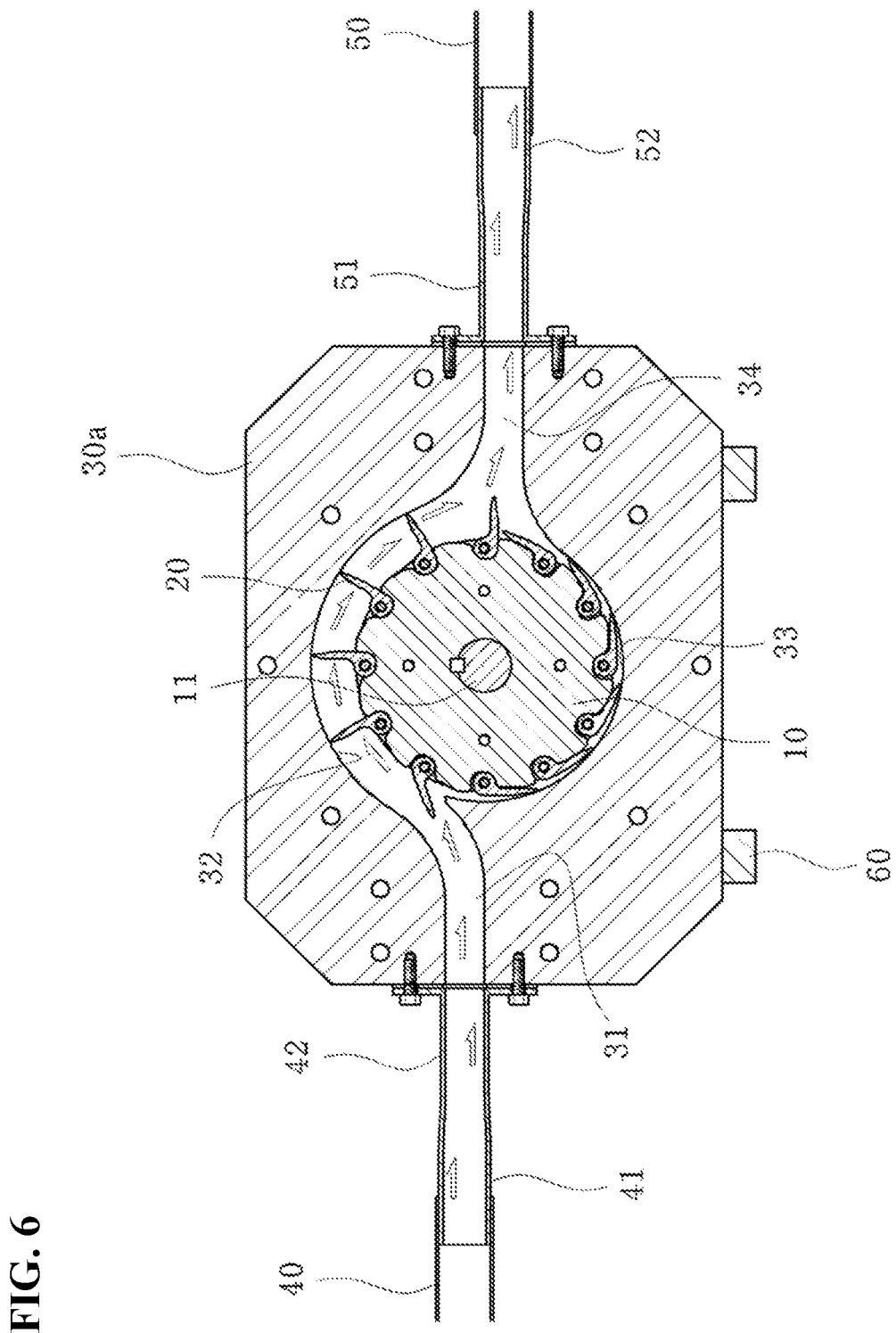
FIG. 6 is a front cross-sectional view showing the present invention.
Figure 7:
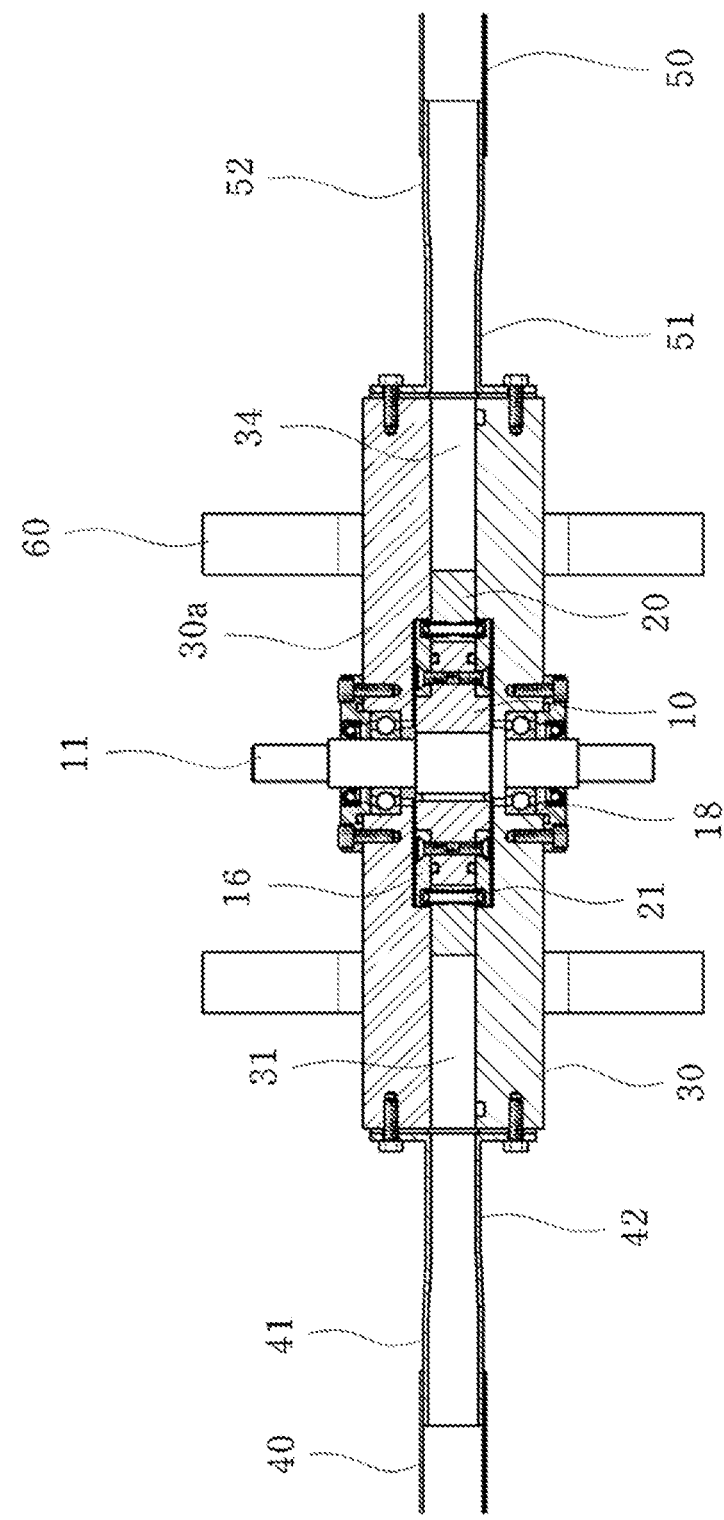
FIG. 7 is a cross-sectional view showing the present invention.
Figure 8:
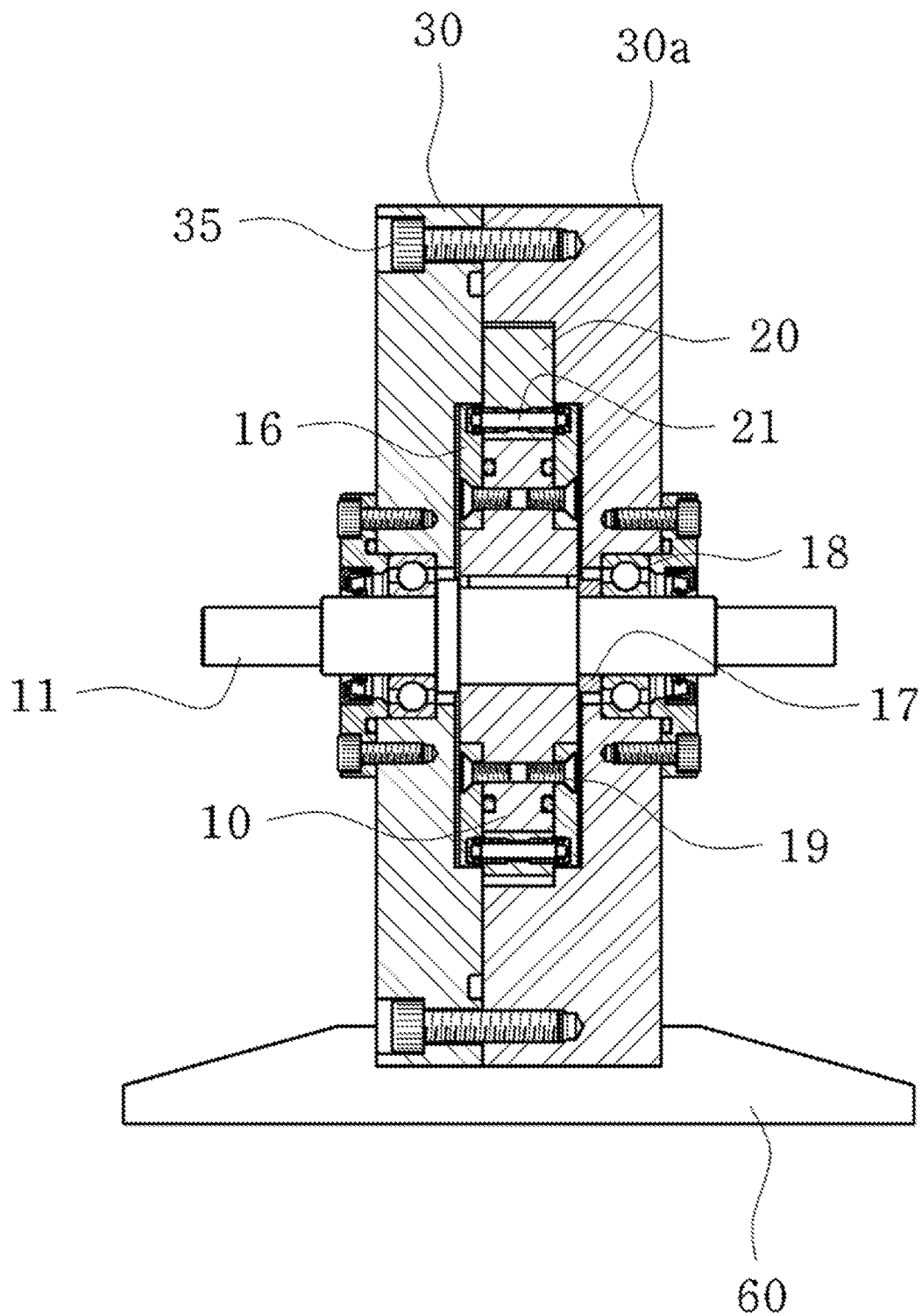
FIG. 8 is a side cross-sectional view showing the present invention.
Figure 9:
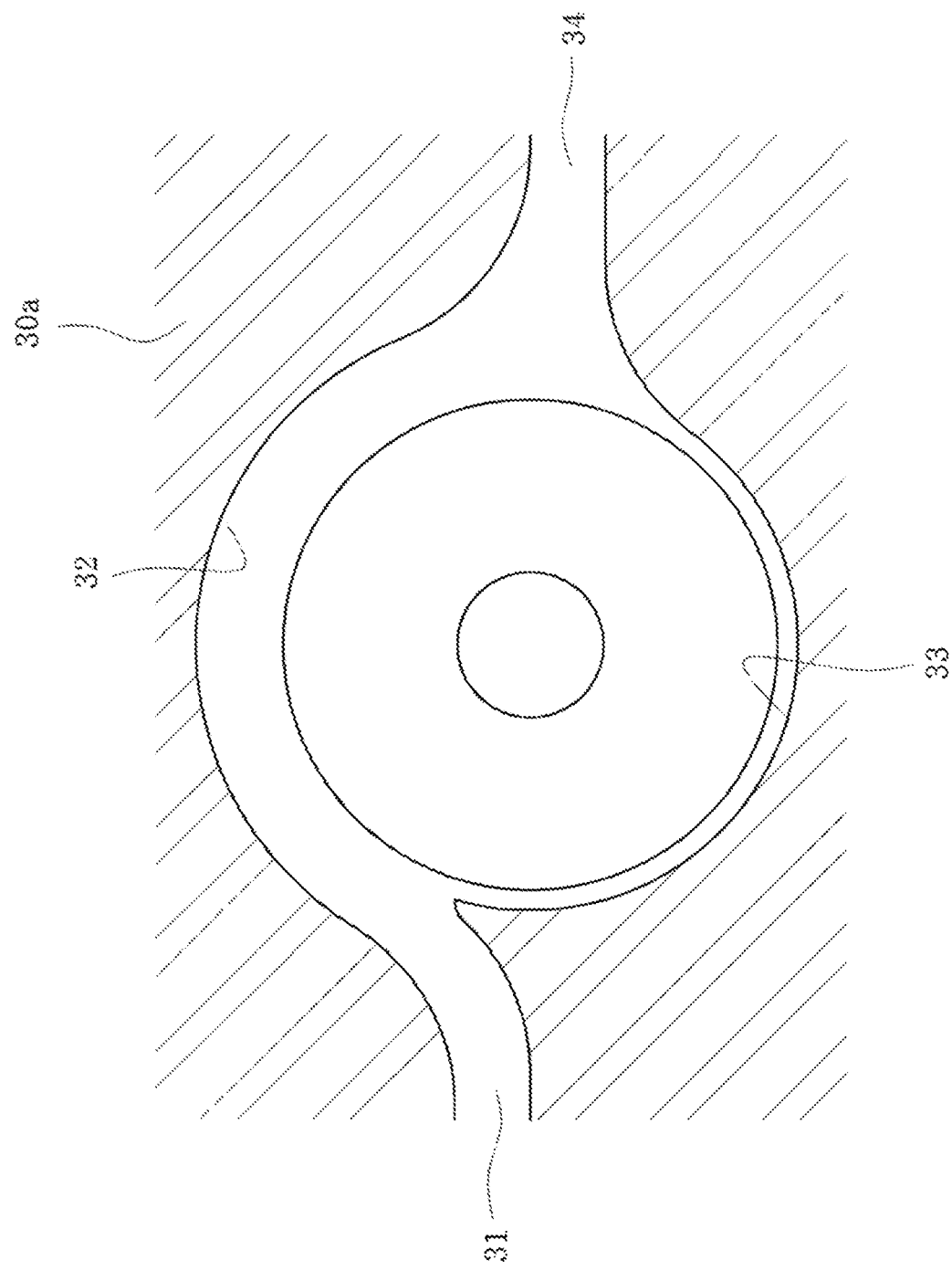
FIG. 9 is a front cross-sectional view showing a guide unit of the present invention.

FIG. 1 is a perspective view showing installation of an embodiment of the present invention, FIG. 2 is a perspective view showing the inside of the present invention, FIG. 3 is a front view showing the present invention, FIG. 4 is a plan view showing the present invention, FIG. 5 is a side view showing the present invention, FIG. 6 is a front cross-sectional view showing the present invention, FIG. 7 is a cross-sectional view showing the present invention, FIG. 8 is a side cross-sectional view showing the present invention, and FIG. 9 is a front cross-sectional view showing a guide unit of the present invention.

An inlet port 41 connected to an inlet pipe 40 for supplying fluid including water is formed in a circular shape at the front and a rectangular inlet pipe 42 having a rectangular cross-section and formed at a side of the inlet port 41 is connected to the front of an inlet 31.

The inlet 31 connected to the rectangular inlet pipe 42 is formed by a pair of guide units 30 and 30a and the guide units 30 and 30a are fastened by bolts 35.

A rectangular outlet pipe 51 having a rectangular cross-section is connected to the end of an outlet 34 formed at the rears of the guide units 30 and 30a and an outlet pipe having an outlet port 52 is connected to the rectangular outlet pipe 51.

The guide units 30 and 30a form an upper drainage 32 through which water flowing into the upper portion between the inlet 31 and the outlet 34 is discharged after rotating blades 20 and form a blade guide 33 through which the blades 20 are rotated in a reclined position.

A packing 25 may be disposed for sealing between a turbine 10 and turbine covers 16.

The turbine covers 16 are fixed to the turbine 10 having the blades 20 arranged with regular intervals by turbine screws 19, a turbine shaft 11 at the center of the turbine 10 is disposed to pass through the guide units 30 and 30a to be rotatable in the guide units 30 and 30a by a turbine shaft bushing 17 and bearings 18.

The turbine shaft 11 is covered with shaft covers 16 outside the guide units 30 and 30a.

The turbine 10 having the blades 20, which are formed with regular intervals on the outer side of the turbine 10 and is naturally reclined or deployed by water when rotating, is disposed under the upper drainage 32 to be rotated on the turbine shaft 11.

The inlet 31 for supplying water to the turbine 10 inside the guide units 30 and 30a guides water to the upper portion inside the guide units 30 and 30a so that the water is supplied between the upper drainage 32 and the outer side of the turbine 10. A blade guide 33 is formed at the lower portion inside the guide units 30 and 30a so that the blades 20 are reclined when the turbine 10 is rotated. The outlet 34 is formed at the right end of the blade guide 33 to be wide horizontally or toward the outlet so that water can be easily discharged straight.

Figure 10:
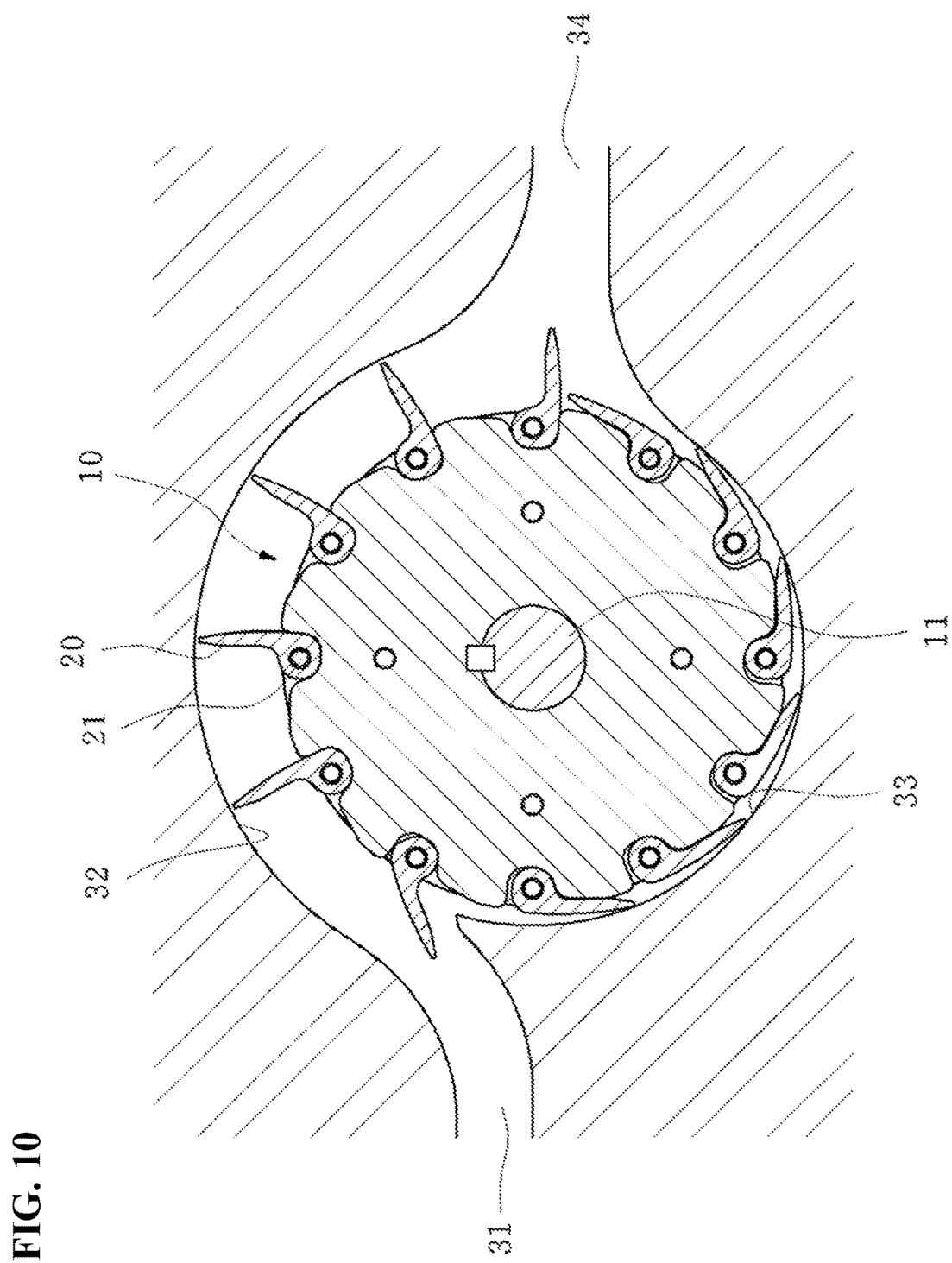
FIG. 10 is an enlarged view showing main parts of the present invention.
Figure 11:
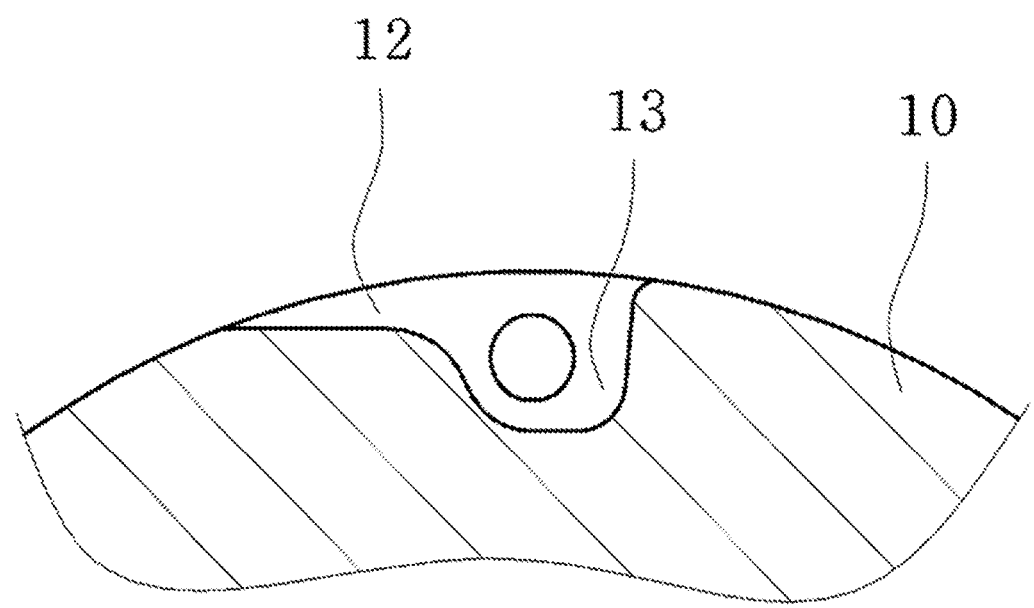
FIG. 11 is a front view of a turbine without a blade of the present invention.
Figure 12:
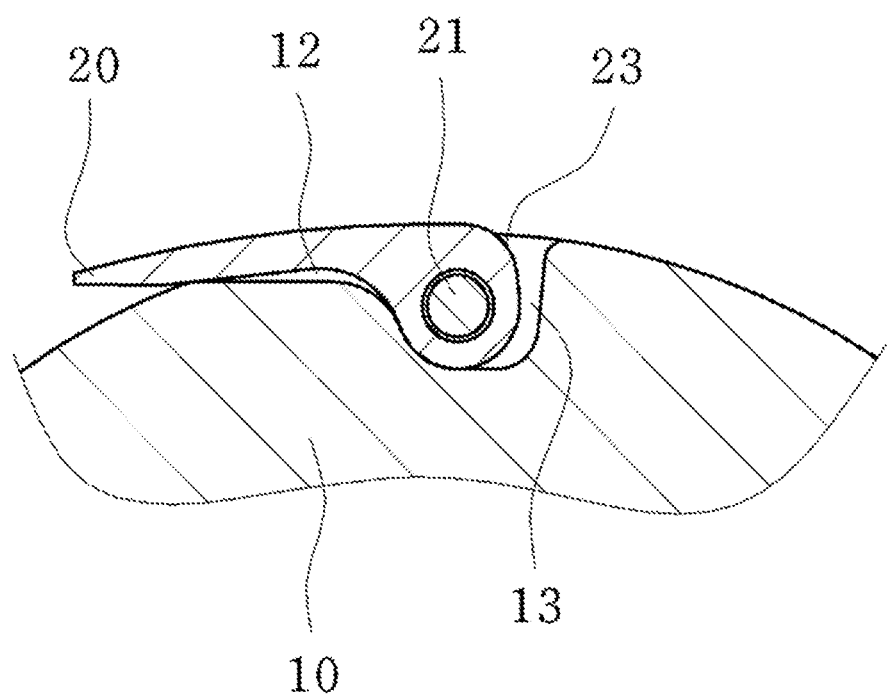
FIG. 12 is an enlarged front view of main parts when blades of the present invention are reclined.
Figure 13:
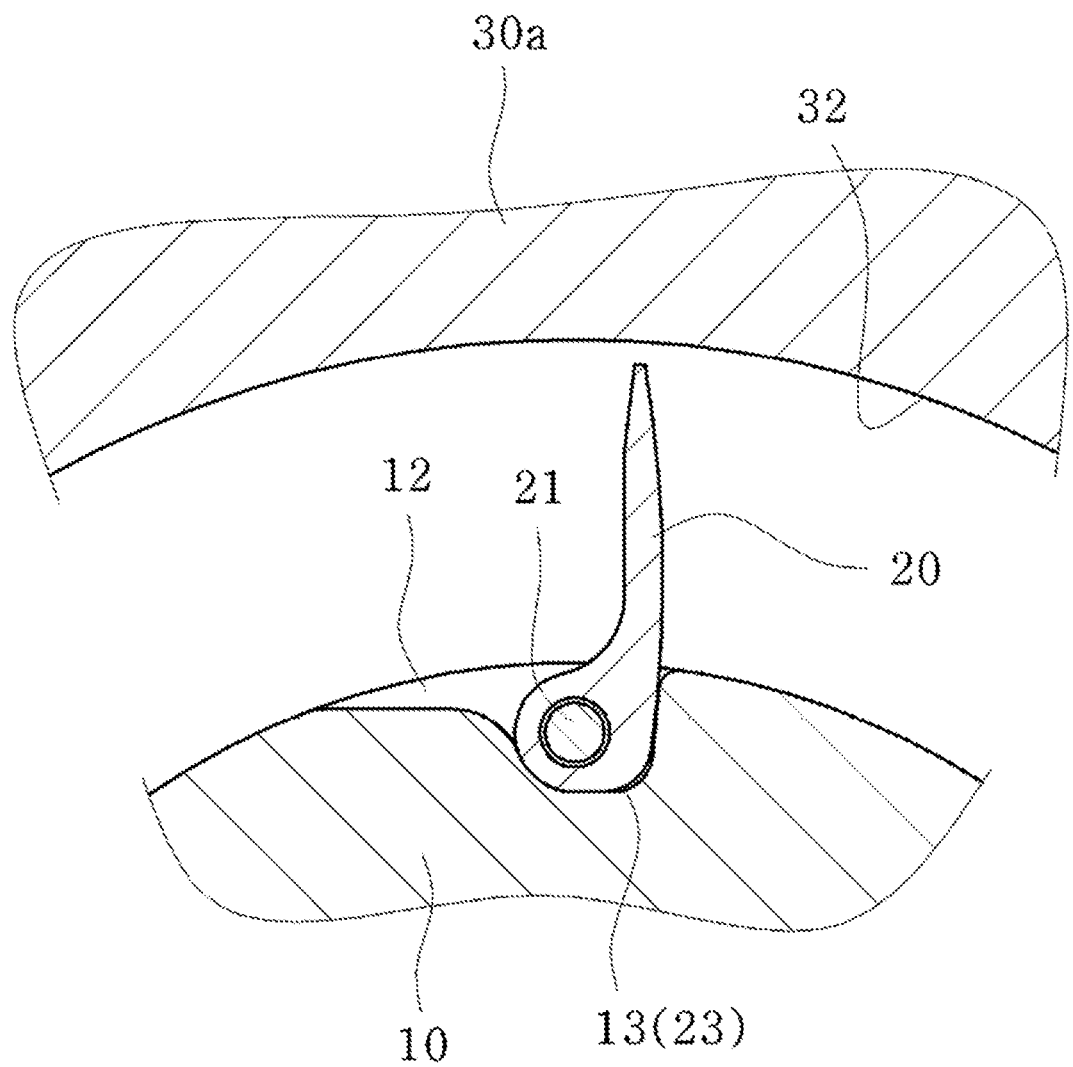
FIG. 13 is an enlarged front view of main parts when blades of the present invention are deployed.
Figure 14:
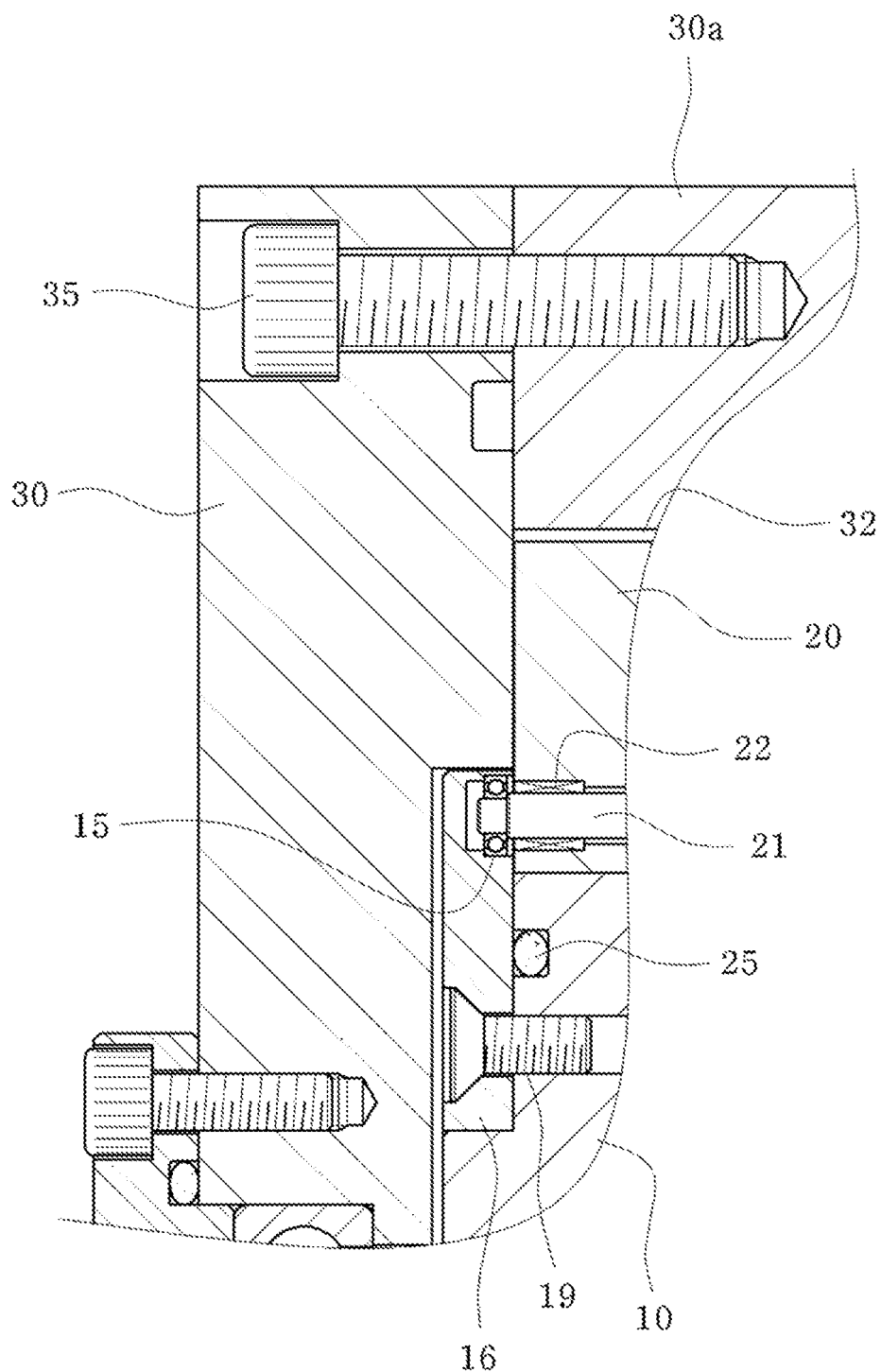
FIG. 14 is a side cross-sectional view when a turbine and blades of the present invention are combined.

FIG. 10 is an enlarged view showing main parts of the present invention, FIG. 11 is a front view of a turbine without a blade of the present invention, FIG. 12 is an enlarged front view of main parts when blades of the present invention are reclined, FIG. 13 is an enlarged front view of main parts when blades of the present invention are deployed, and FIG. 14 is a side cross-sectional view when a turbine and blades of the present invention are combined.

The turbine 10 has a circular shape and has blade seats 12 allowing the blades 20 arranged with regular intervals to be reclined at a predetermined angle without interference. Further, an L-shaped reinforcing groove 13 rounded at the corner is formed at a side in each of the blade seats 12.

A fixing shaft 21 is disposed through the reinforcing grooves 13 on the turbine 10 through a movable bushing 22 to rotatably couple the blades 20.

The fixed shaft 21 is coupled to turbine covers 16 at both sides of the turbine 10 through a fixed bearing 15 or a bushing and a movable bushing 22 is fitted on the fixed shaft 21 so that the blade 20 can rotate. The reinforcing groove 13 fits to the rear and bottom of a reinforcing portion 23 when the blade 20 is erected.

A gap between the blade guide 33 and the turbine 10 is formed narrow so that the blades 20 are rotated in a reclined position, while a gap between the power generation guide 41 and the turbine 10 is formed wide so that the blades 20 are deployed and rotated by water flowing to the turbine 10.

The blade 20 vertically extends from the reinforcing portion 23 and is then curved upward at the end. Further, the blade 20 is rounded at the reinforcing portion 23, extends to fit to the blade seat 12, and is inclined downward at the front end of the blade seat 12, in the shape of . Further, the outer portion of the front end of the blade 20 partially protrudes out of the blade seat 12 when it is reclined to be turned and deployed by water or reclined inside the blade guide 33.

The width, height, and size of the blade 20 can be changed, depending on pipes, the installation position, and the power generation capacity.

The power generation guide 41 maintains the same gap from the position where the blades 20 are deployed to the front of the outlet 34, and a gap is defined between the front ends of the blades 20 to the power generation guide 41 to make a velocity head so that the same pressure is applied to the blades 20.

According to the hydroelectric power generator for a pipeline that is installed in pipes for supplying various fluids, water is supplied to the inlet 71 from the rectangular inlet pipe 42 through which the circular cross-section is changed into a rectangular cross-section from the inlet port 41, flows upward through the rectangular inlet 71, flows through the space at a predetermined speed between the turbine 10 and the upper drainage 32, and is then discharged out through the turbine 10.

When the hydroelectric power generator for a pipeline of the present invention is installed, various streams are generated through a pipe by the amount of water, slope, and pressure, and when power generation is possible by a stream, the generator can be sequentially installed, so hydroelectric power generation using eco-friendly energy through various pipes can be achieved, using a low head drop.

When the generator of the present invention is connected to a pipe, water is guided to the turbine 10 and under the upper drainage 32 through the inlet 31.

When water passing through the inlet 31 is supplied to the upper portion of the turbine 10, the blades 20 reclined in the blade seats 12 with the front ends partially exposed on the outer side of the turbine 10 is deployed by the water.

Since the blades 20 are installed in the blade seats 12 by the fixed shafts 21 and can be rotated by the movable bushings 22, they are deployed inside the upper drainage 32 by the water and force that moves the blades 20 is generated by the stream flowing through the inlet 40, thereby providing torque for continuously rotating the turbine 10.

When the blades 20 are erected in the blade seats 12, the reinforcing portions 23 and the reinforcing grooves 13 fit to each other at the rounded corners of the L-shape, so the reinforcing portions 23 fit to the rear and bottom of the reinforcing grooves 13. Accordingly, torque can be stably provided even though load is applied to the blades 20 by the water, whereby a reinforcing effect can be achieved.

That is, the width and height of the blades 20 can be varied and can be rotatably installed on the fixed shafts 21 by the movable bushings 22 on the outer side of the turbine 10. When the blades 20 have a large wide, uniform load is applied to the large widths of the reinforcing portions 23 and the reinforcing grooves 13, so power generation can be performed without heavy load to the blades 20 and the turbine 10.

The blades 20 and the turbine 10 show different efficiencies, depending on their materials, but they may be made of relatively light and strong metal.

The blades 20 are deployed by a stream and provide force for rotating the turbine 10 while passing through the arc-shaped upper drainage 32, and are partially blocked and naturally reclined into the blade seats 12 when they reach the blade guide 33 after passing the upper drainage 32. Further, the blades 20 reclined in the blade seats 12 pass the blade guide 33 and rotate with the turbine 10 without a loss of power.

In particular, the stream and the blades 20 rotate the turbine 10 by moving in the same direction, so high-efficiency power generation is possible.

Further, it is possible to increase the efficiency of power generation by increasing the angular speed at the same flow speed by adjusting the number and radius of the blades 20 on the turbine 10.

Further, a velocity head is generated by a predetermined gap between the front ends of the blades 20 and the upper drainage 32, so the same pressure is applied to the blades 20 by water inside the upper drainage 32. Further, when the blades 20 are deployed at the upper drainage 32 and three to eight blades are rotated, torque corresponding to the number of the deployed blades 20 is applied to the turbine shaft 11, whereby high-frequency power generation is achieved.

The velocity head is described in detail. The upper drainage 32 has a predetermined gap from the outer side of the turbine 10 and maintains a predetermined gap from the front ends of the blades 20 when the blades 20 are deployed and rotated, thereby generating a velocity head, applying torque to the turbine 10, and applying the same flow rate and pressure to the blades 20 inside the upper drainage 32. Accordingly, when five blades 20 are deployed inside the upper drainage 32 by the flow rate applied to one blade 20, five-time larger torque is provided, as compared with the related art, thereby achieving high-efficiency power generation.

The water that has passed through the upper drainage 32 flows outside through the outlet 34 between the upper drainage 32 and the blade guide 33. Further, the outlet 34 is formed relatively long so that the water flows straight after the stream is curved through the blades 20 and easily flows outside through the outlet 34.

The water flowing through the outlet 34 flows through the rectangular outlet pipe 51 and is then discharged outside through the outlet port 52 and the outlet pipe 50.

The packing 25 is disposed between the turbine 10 and the turbine covers 16 so that water flowing inside can be used to rotate the turbine 10 and then discharged outside without influence on other parts. The turbine shaft 11 is held through the guide units 30 and 30*a* by the turbine shaft bushing 17 and the bearings 18 to be stably rotated for power generation.

Legs 60 are formed at both sides on the bottoms of the guide units 30 and 30*a* to stably maintain the generator at a desired place.

The present invention is not limited to the exemplary embodiments described above and may be modified in various ways by those skilled in the art, and the modifications should be construed as being included in the similar range defined by patent laws.

The hydroelectric power generator of the present invention can be used to efficiently generate power using eco-friendly energy, using blades and a turbine that is installed in a pipe through which water flows.

What is claimed is:

1. A hydroelectric power generator for a pipeline, comprising:
    a rectangular inlet pipe (42) having an inlet port (41) connected to an inlet pipe (40), and connected to an inlet (31) through the inlet port (41);
    a pair of guide units (30, 30*a*) forming an upper drainage (32) in which blades (20) are deployed at an upper portion behind the inlet (31) connected to the rectangular inlet pipe (42), a blade guide (33) formed under the upper drainage (32) so that the blades (20) are reclined therein, and an outlet (34) for discharging water flowing through the upper drainage (32);
    a turbine (10) fitted on a turbine shaft (11) disposed through the guide units (30, 30*a*), having reinforcing grooves (13) fitted on two sides to reinforcing portions (23) of the blades (20) in blade seats (12) formed with regular intervals on an outer side thereof, having fixed shafts (21) disposed through the blade seats (12), having a narrow gap from a blade guide (33) to recline the blades (20) and a wide gap from a power generation guide (41) to deploy the blades (20), combined with turbine covers (16) on both sides by turbine screws (19) to be rotatable inside the guide units (30, 30*a*) such that the turbine shaft (11) rotates on bearings (18) through the guide units (30, 30*a*);
    the blades (20) disposed in the blade seats (12), coupled to the turbine covers (16) through the fixed shaft (21), and rotating the turbine (10) when deployed by water; and
    a rectangular outlet pipe (51) connected to the outlet (34) and having an outlet port (52) connected to an outlet pipe (50),
    wherein a packing (25) is disposed between the turbine covers (16) coupled to both sides of the turbine (10) and the blades (20) are disposed in the blade seats (12) formed with regular intervals, and
    the blades (20) are fitted on the fixed shafts (21), are rotatably held at both sides by movable bushings (22), have an outer end protruding from the blade seats (12), and have the reinforcing portion (23) fitted to two sides of the reinforcing grooves (13).

2. The hydroelectric power generator of claim 1, wherein the blades (20) are disposed in the blade seats (12) and fitted on the fixed shafts (21) through movable bushings (22) and both ends of the fixed shafts (21) are rotatably coupled to the turbine covers (16) through fixed bearings (15).

3. The hydroelectric power generator of claim 1, wherein in the guide units (30, 30*a*), the inlet (31) is connected to the rectangular inlet pipe (42) and connected to the upper drainage (32) at an upper portion to supply, the turbine (10) is disposed between the upper drainage (32) and the blade guide (33), and the outlet (34) is formed at a rear.

4. The hydroelectric power generator of claim 1, wherein the rectangular inlet pipe (42) is connected to the inlet (31), has the inlet port (41) having a circular shape connected to the inlet pipe (40), and has a rectangular portion at a side of the inlet port (41) to be fastened to the guide units (30, 30*a*).

5. The hydroelectric power generator of claim 1, wherein the rectangular outlet pipe (51) is connected to the outlet (34), has the outlet port (52) having a circular shape connected to the outlet pipe (50), and has a rectangular portion at a side of the outlet port (52) to be fastened to the guide units (30, 30*a*).

6. The hydroelectric power generator of claim 1, wherein the upper drainage (32) is formed at a predetermined distance from the outer side of the turbine (10) such that the blades (20) make velocity heads with regular intervals between the upper drainage (32) and ends of the blades (20) while moving in a deployed position to apply torque to the turbine (10) and receive the same flow rate and pressure inside the upper drainage (32).

7. The hydroelectric power generator of claim 1, wherein legs (60) are fixed to both sides of bottoms of the guide units (30, 30a).

8. The hydroelectric power generator of claim 1, wherein the blades (20) are disposed in the blade seats (12) of the turbine (10), three to eight of the blades (20) are deployed at the upper drainage (32) by water to rotate with a predetermined gap between ends thereof and the upper drainage (32).

* * * * *